(12) United States Patent
Hoshino

(10) Patent No.: US 6,691,367 B2
(45) Date of Patent: Feb. 17, 2004

(54) WIPER APPARATUS

(75) Inventor: Takashi Hoshino, Isesaki (JP)

(73) Assignee: Mitsuba Corporation, Kiryu (JP)

( * ) Notice: Subject to any disclaimer, the term of this patent is extended or adjusted under 35 U.S.C. 154(b) by 449 days.

(21) Appl. No.: 09/784,100

(22) Filed: Feb. 16, 2001

(65) Prior Publication Data

US 2001/0016964 A1 Aug. 30, 2001

(30) Foreign Application Priority Data

Feb. 29, 2000 (JP) ........................................ 2000-053800

(51) Int. Cl.⁷ ............................ B60S 1/16; B60S 1/18; B60S 1/24; B60S 1/32
(52) U.S. Cl. .............. 15/250.3; 15/250.27; 15/250.352; 15/250.351; 15/250.34
(58) Field of Search ......................... 15/250.13, 250.14, 15/250.16, 250.27, 250.3, 250.31

(56) References Cited

U.S. PATENT DOCUMENTS

| | | | | | |
|---|---|---|---|---|---|
| 3,745,853 | A | * | 7/1973 | Deibel et al. ................. | 74/586 |
| 4,765,019 | A | * | 8/1988 | Ochino .................... | 15/250.19 |
| 5,050,442 | A | * | 9/1991 | Reed .............................. | 74/42 |
| 5,142,729 | A | * | 9/1992 | Imamura ................. | 15/250.16 |
| 5,201,094 | A | * | 4/1993 | Yamamoto et al. ...... | 15/250.13 |
| 5,690,207 | A | * | 11/1997 | Scherch et al. ............. | 192/138 |
| 5,983,439 | A | * | 11/1999 | Hojnacki ................... | 15/250.3 |
| 6,393,653 | B1 | * | 5/2002 | Harris et al. ............... | 15/250.3 |

* cited by examiner

*Primary Examiner*—Terrence R. Till
(74) *Attorney, Agent, or Firm*—Oliff & Berridge, PLC (57) ABSTRACT

The invention relates to a wiper apparatus in which a pair of pivot axes are provided, one pivot axis at the central portion and the other pivot axis one side portion in the left and right direction of the window surface. In the invention, wherein the rod rush angle formed by a link arm, which rotates the pivot axes clockwise and counterclockwise, and a link rod can be made as small as possible. The second pivot axis at one side portion is disposed so that the plane, including the swinging locus, of the second link arm, that is coupled to the corresponding second pivot axis, and the axial line of the second link rod, in the lengthwise direction, are made roughly parallel to each other.

4 Claims, 7 Drawing Sheets

WIPER APPARATUS

BACKGROUND OF THE INVENTION

1. Field of Invention

The invention belongs to the technical art of a wiper apparatus incorporated in vehicles, such as automobiles, buses, trucks, etc.

2. Description of Related Art

Generally, in this type of wiper apparatus, a parallel wiping type wiper apparatus is known, which is structured so that a pair of pivot axes are provided approximately parallel to each other at a roughly central part and one side in the left and right direction of a window surface, respective wiper arms attached to the pivot axes are reciprocated and are caused to swing in the upper and lower reciprocatory range on the window surface to wipe off the window surface. In such a type of wiper apparatus, there is a type structured such that the two pivot axes are rotated clockwise and counterclockwise by one drive motor, wherein a link mechanism is provided with a link rod that advances and retreats upon receiving the rotating drive power of a wiper motor, and first and second link arms that swing upon receiving advancement and retreating movement of the corresponding link rod, the corresponding link mechanism is connected to the wiper motor, and the respective pivot axes are integrally linked to the respective swinging first and second link arms. Thereby, the respective pivot axes are rotated clockwise and counterclockwise.

However, in a case where the above-described parallel wiping type wipers are attached to a window surface of a vehicle, because the window surface is generally formed so as to be curved in the left and right direction, and because the respective pivot axes are attached normal to the tangential line of the window surface portion of the vehicle, the pivot axis attached at one side faces outwardly in the left or right direction with respect to the curved surface of the window, and is caused to protrude for an axial slip with respect to the pivot axis for the central portion.

Figure 6:
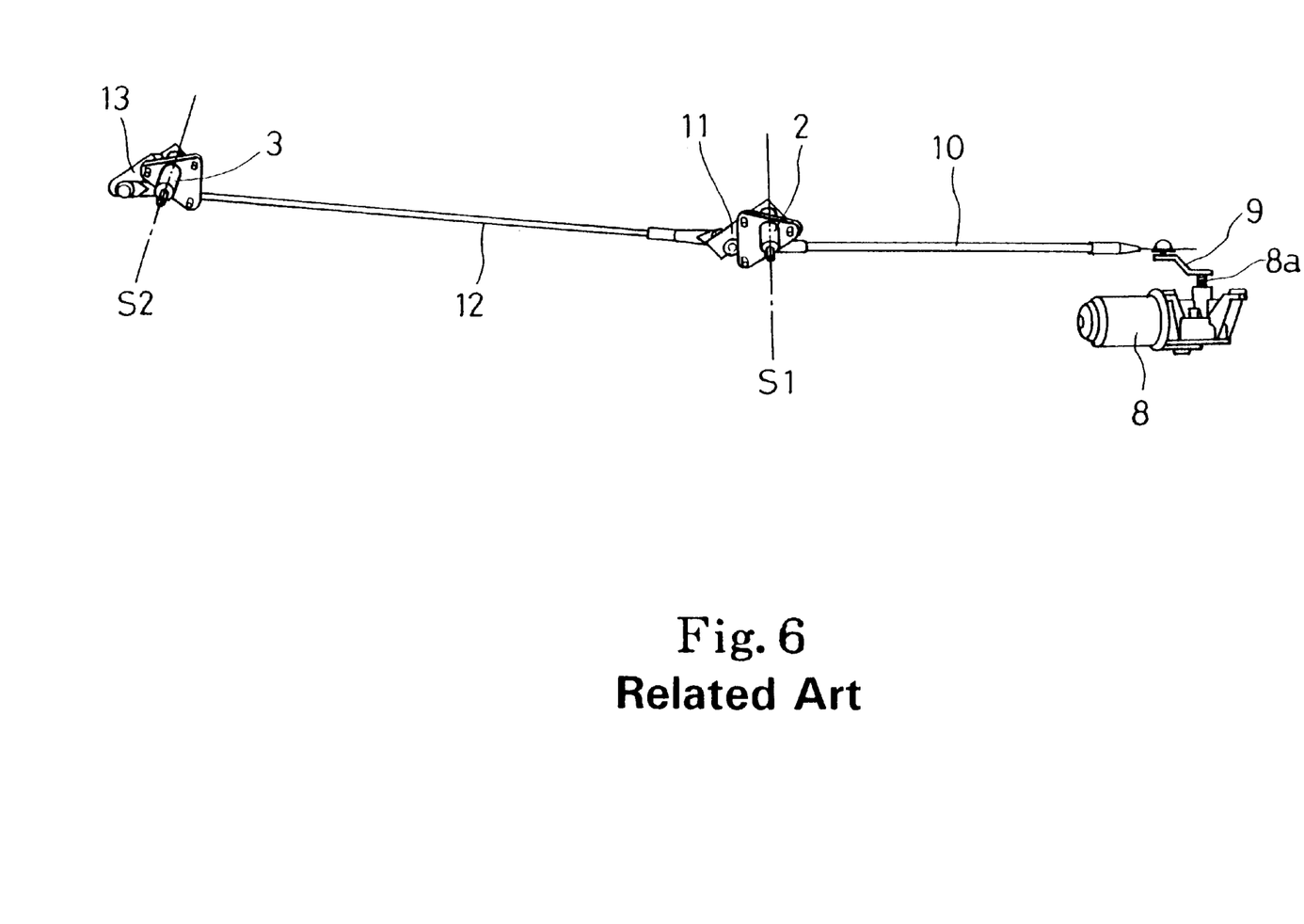
FIG. 6 is a frontal view showing a link mechanism of a related art wiper apparatus.
Figure 7:
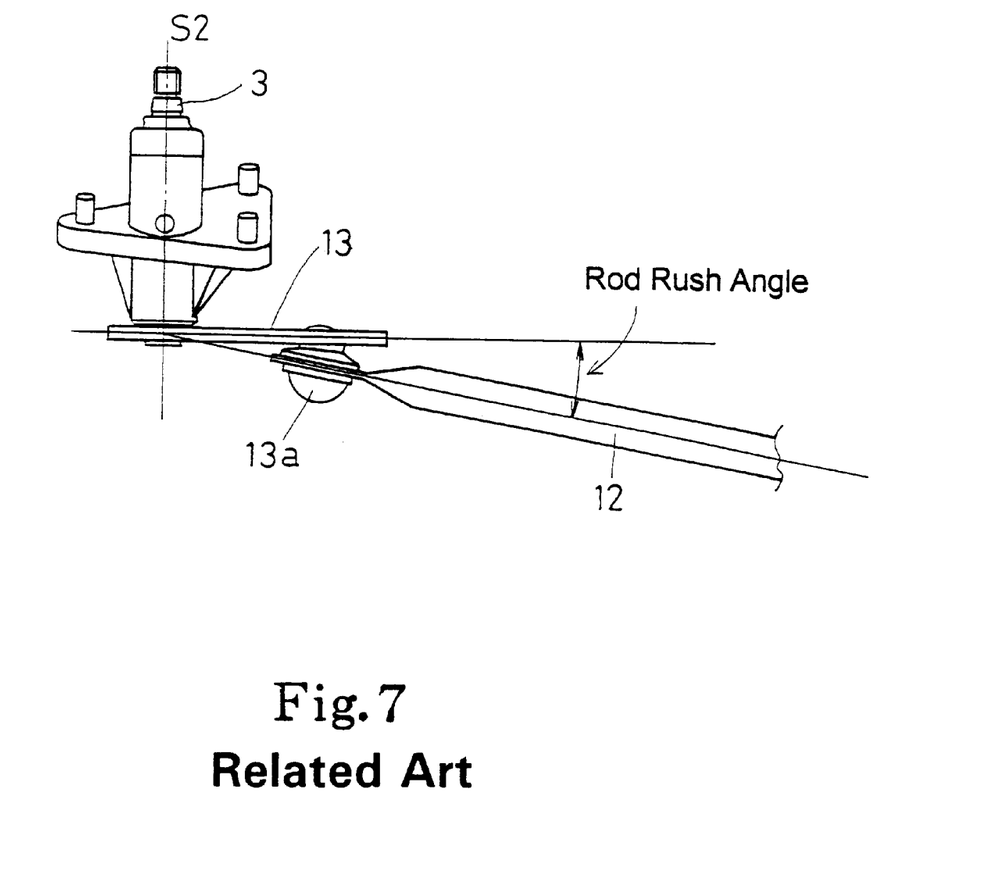
FIG. 7 is a frontal view of a pivot axis portion describing a rod rush angle.

However, in such a case, as shown in FIG. 6, because the axial slip occurs between the axial center line S1 of the pivot axis 2 for the central portion and the axial center line S2 of another pivot axis 3 for one side, the link surfaces (planes including the reciprocating swinging locus) of the first and second link arms 11, 13, which are connected roughly orthogonally to the respective pivot axes 2 and 3, are not parallel to each other, wherein the swinging direction thereof accordingly slips. Therefore, as shown in FIG. 7, a so-called rod rush angle between the second link rod 12 and the first and second link arms 11, 13 may be increased. Ideally, it is preferable that the rod rush angle be zero (wherein the axial line in the longitudinal direction of the second link rod 12 and the plane including the reciprocatory swinging locus of the respective first and second link arms 11 and 13 become parallel to each other). Therefore, if the rod rush angle is increased and exceeds a predetermined angular range, abnormal noise is generated between the second link rod 12 and the first and second link arms 11, 13, and inefficient power transmission may result. In addition, there is a fear that the second link arm 12 will fold or bend or that the second link rod 12 will come out of, or disengage from, the respective link arms 11, 13. The theme of the invention resides therein.

SUMMARY OF THE INVENTION

The invention was developed in view of the above-described situations in order to solve the problems. It is therefore an object of the invention to provide a wiper apparatus comprising a pair of pivot axes, one of which is disposed at the lower, roughly central portion in the left and right direction of a curved window surface of a vehicle so as to protrude therefrom, and the other of which is disposed at the lower, one side portion of the curved window surface of a vehicle so as to protrude therefrom; a pair of link arms, each secured at the lower end of the respective pivot axes; a link rod for connecting the respective link arms; and a wiper motor coupled to and interlocked with the link rod; in which wiper arms, each disposed at the tip ends of the pivot axes, are structured so that the wiper arms are caused to wipe off the window surface through reciprocation on the basis of reciprocatory swinging of the respective link arms resulting from drive and rotation of the wiper motor; wherein a surface including a reciprocatory swing locus of at least one link arm is disposed so as to become parallel to the axial line in the lengthwise direction of the link rod.

As a result, the rod rush angle, that is formed by the link arm and link rod, can be decreased.

In such a type of wiper apparatus, surfaces in the forward and backward direction, including the axial centerlines of the respective pivot axes according to the invention, are disposed so as to become roughly parallel to each other.

In addition, surfaces in the left and right direction, including the axial centerlines of the respective pivot axes according to the invention, are disposed so as to become roughly parallel to each other.

Also, the protruding end portion of one pivot axis according to the invention is inclined for positional slip in the forward and backward direction with respect to the protrusion end portion of the other pivot axis.

Further, the wiper arms according to the invention are provided with a wiper blade at the tip ends thereof in a state where the wiper blade is pressed to the window surface of the vehicle, and the pressing direction of the wiper blade is established so as to be inclined with respect to the axial center line of the pivot axes so that the direction becomes roughly orthogonal to the window surface.

BRIEF DESCRIPTION OF THE DRAWINGS

The foregoing and other features and advantages of the invention will become more readily appreciated as the same becomes better understood by reference to the following detailed description when taken in conjunction with the accompanying drawings wherein.

DETAILED DESCRIPTION OF PREFERRED EMBODIMENTS

Figure 1:
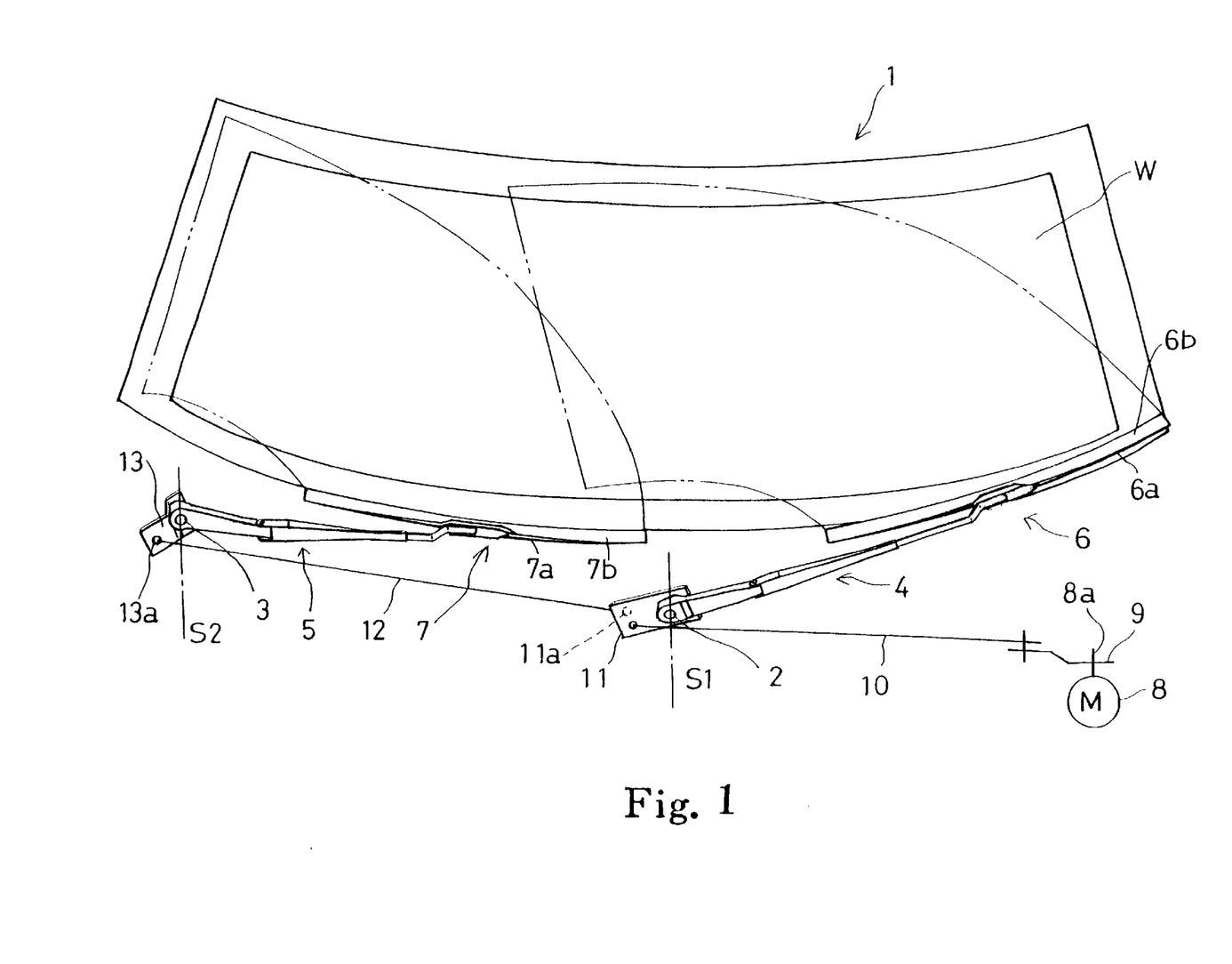
FIG. 1 is a roughly frontal view showing a wiper apparatus.
Figure 2:
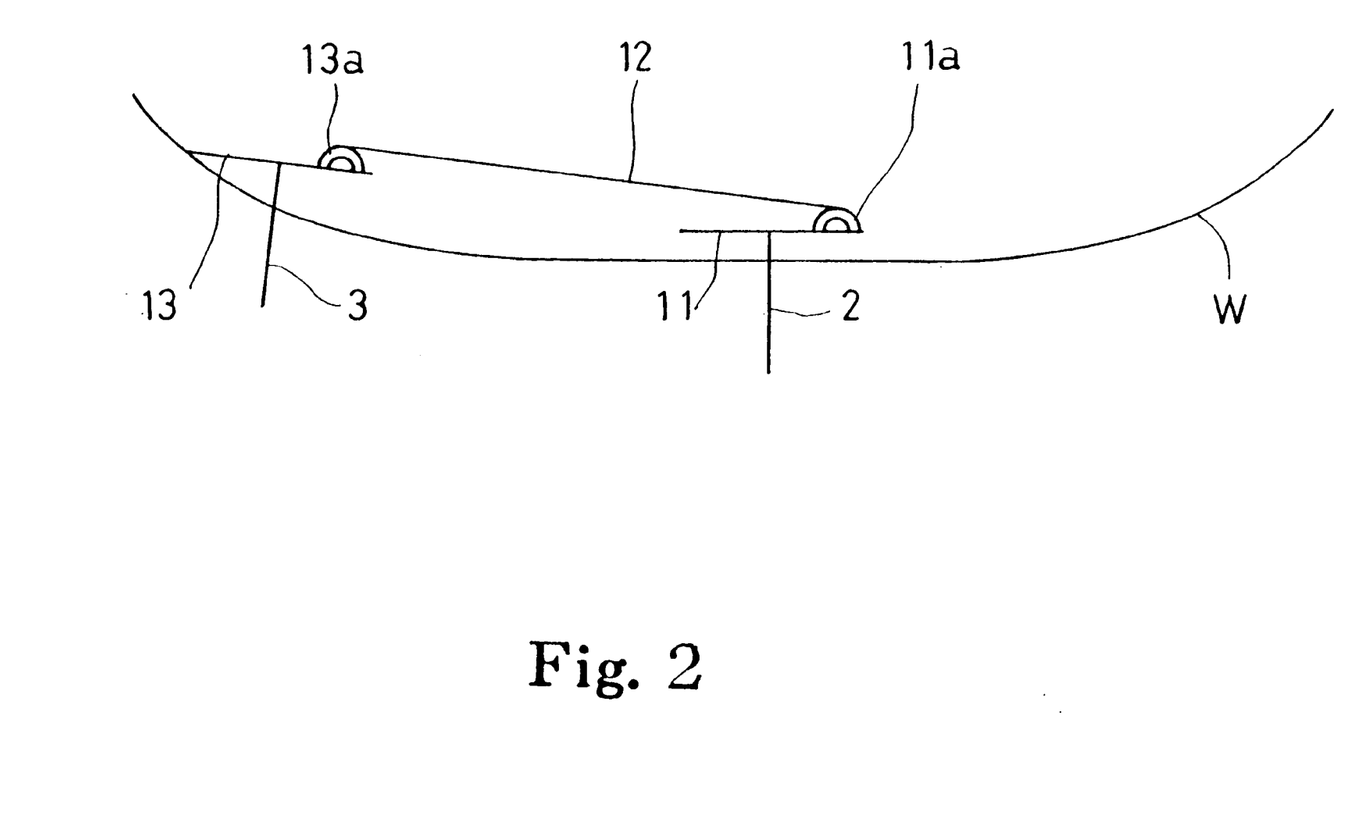
FIG. 2 is a schematic plan view showing the wiper apparatus.

A description is given of a first embodiment of the invention with reference to FIGS. 1 and 2. In the drawings, a wiper apparatus 1 is disposed on a curved window surface W. A pair of first (for the central portion) and second (for one side portion) pivot axes 2, 3, which constitute the wiper apparatus 1, are rotatably attached so as to penetrate the body of a vehicle. The pivot axes 2, 3 respectively oppose a roughly central portion and one side portion, in the left and right direction, of the lower part of the window surface W. The first and second wiper arms 4, 5 are attached to the end portion, protruding outward from the body, of the respective pivot axes 2, 3. Wiper blades 6, 7, connected to the first and second wiper arms 4, 5, are structured so that one half portion and the other half portion of the window surface W are, respectively, wiped. The first and second wiper blades 6, 7 are provided with first and second blade levers 6a, 7a attached to the tip end of the first and second wiper arms 4, 5, so as to freely swing. The first and second rubber blades 6b, 7b are each integrally attached to the first and second blade levers 6a, 7a, respectively. A resiliently pressing mechanism (not illustrated), internally attached in the wiper arms 4, 5 causes the first and second blade rubbers 6b, 7b to swing while being pressed to the window surface, thereby allowing the window surface to be wiped.

A link mechanism, that constitutes a power transmission mechanism, is connected to the end portion of the first and second pivot axes 2, 3 protruding into the body. The link mechanism is provided with a crank arm 9, having a base end portion fixed integrally at an output shaft 8a of a wiper motor 8 disposed at the other side of the body of a vehicle. The crank arm a rotates along with the output shaft 8a. The first link rod 10, having its base end portion connected to the tip end portion of the crank arm 9 so as to swing, advances and retreats (moves so as to advance and retreat) on the basis of the rotating movement of the crank arm 9. The first link arm 11 has its base end portion connected to the tip end portion of the first link rod 10 so as to swing and has the above-described first pivot axis 2 integrally fixed at the tip end portion thereof, the second link rod 12 has its base end portion swingably linked with the first link arm 11, and the second link arm 13 has its base end portion connected to the tip end portion of the second link rod 12 so as to swing and has the above-described second pivot axis 3 integrally fixed at the tip end portion thereof. The first and second link rods 10, 12 advance and retreat in line with rotation of the wiper motor 8 in one direction. In line therewith, the first and second link arms 11, 13 are mounted so as to swing using the first and second pivot axes 2, 3 as fulcrums, whereby clockwise and counterclockwise rotation of the first second pivot axes 2, 3 is carried out, thereby causing the first and second wiper arms 4, 5 to reciprocate and swing between the lower reversing position located at the lower end portion of the window surface W and the upper reversing position erected at the central portion and one side portion of the window surface W.

Furthermore, the above-described window surface W is curved and bent toward both sides thereof, and the first pivot axis 2 at the central portion is disposed so as to penetrate the body of a vehicle in a state where the axial center line S1 becomes roughly parallel to the center line in the forward and backward direction of the vehicle body and its protruding direction is faced diagonally upward (in the normal direction of the tangential line passing through the roughly central portion of the window surface of a vehicle).

On the other hand, the second pivot axis 3, at one side portion, is disposed so that the plane including the reciprocatory swinging locus of the second link arm 13 interlinked with the corresponding second pivot axis 3 becomes roughly parallel to the axial line oriented in the longitudinal direction of the second link rod 12. That is, the plane in the forward and backward direction, including the axial center line S2 of the second pivot axis 3 becomes roughly parallel with the plane in the forward and backward direction, including the axial center line S1 of the first pivot axis 2. In addition, the second pivot axis 3, according to the embodiment, protrudes in the same forward and backward direction as the protrusion direction of the first pivot axis 2 (that is, in a state where the planes in the left and right direction including the respective axial center lines S1, S2 are roughly parallel to each other), wherein the above-described axial center lines S1 and S2 are roughly parallel to each other in either of a front elevational view, a plan view or a side elevational view (that is, the axial center lines S1 and S2 are relatively parallel to each other).

Therefore, when the axial line of the second link rod 12 in the longitudinal direction becomes roughly parallel to the plane including a reciprocatory swinging locus of the second link arm 13, and the first and second flat link arms 11, 13, which are connected to each other in a state roughly orthogonal to the first and second pivot axes 2, 3, are coupled to each other by ball joints 11a, 13a via the second link rod 12, the rod rush angle of the second link rod 12 into the second link arm 13 can approach 0°.

In the embodiment according to the invention, which is structured as described above, the first and second pivot axes 2, 3 are rotated clockwise and counterclockwise via the link mechanism in which the first and second link rods 10, 12 and the first and second link arms 11, 13 are, respectively, caused to advance and retreat, and reciprocate and swing, wherein the window surface W is wiped by the first and second wiper blades 6, 7 (the first and second rubber blades 6b, 7b). However, in this case, the second pivot axis S2 disposed at one side portion of the window surface W, is located so that the plane, including the reciprocatory swinging locus, of the second link arm 13 becomes roughly parallel to the axial line in the longitudinal direction of the second link rod 12, and the axial center line S1 of the first pivot axis 2 becomes relatively parallel to the axial center line S2 of the second pivot axis 3. Resultantly, the rod rush angle of the second link rod 12 into the second link arm 13 can approach roughly 0°, and there is no case where the link rush angle is increased as in such a type in which the second pivot axis 3 is caused to protrude outward along the curvature as in the applied arts. Therefore, efficient power transmission can be achieved. In addition, it is possible to prevent the first and second link arms 11, 13 and the second link rod 12 from being damaged, wherein the durability thereof is increased, and the reliability of final products is also increased.

Needless to say, the invention is not limited to the above-described embodiment. The invention may also be structured as in the second embodiment shown in FIG. 3 through FIG. 5.

In the second embodiment, the second pivot axis 3 disposed at one side portion in the above-described first embodiment is further inclined forward from a vehicle than the first pivot axis 2. That is, in the above-described first embodiment, the second pivot axis 3 is faced inward in the left and right direction with respect to the window surface curved so as to become substantially parallel to the first pivot axis 2. Therefore, if the pressing angle (pressing direction) of the second blade rubber 7b to the window surface W is set to roughly 90°, which is the optimum, at the lower reversing position (stop position) of the second wiper arm 5, it is conceivable that the second blade rubber 7b will have an error angle in the vicinity of the upper reversing position without the pressing angle becoming 90°. To the contrary, if the tip end portion of the second pivot axis 3, which protrudes outward from the vehicle body, is inclined in the forward direction of the vehicle separating from the window surface W, and is positioned in a forward inclined state that has slipped in the forward and backward direction from the protruding end portion of the first pivot axis 2, whereby the pressing angle of the second blade rubber 7b with respect to the window surface W becomes favorable between the lower reversing position and the upper reversing position of the second wiper arm 5. Thus, the pressing angle can be structured so as to be adjusted.

Herein, by causing the second pivot axis 3 to be inclined further forward than the first pivot axis 2, the planes, including the reciprocatory swinging locus, of the first and second link arms 11, 13, which are integrally linked with the first and second pivot axis 2, 3, will differ from each other. However, in this case, the plane, including the reciprocatory swinging locus, of the second link arm 13 is inclined in the direction orthogonal to the axial line (the advancing and retreating direction of the rod (the elongation direction)) in the longitudinal direction of the second link rod 12. Therefore, the rod rush angle formed by the second link rod 12 and the second link arm 13 may be made smaller than the rod rush angle in a state where axial slips of the first and second pivot axes 2, 3 are, respectively, faced outward and the plane, including the reciprocatory swinging locus, of the second link arm 13 is inclined in the same direction as the axial line in the longitudinal direction of the link rod 12. As a result, in the second embodiment, the wiping function of the wiper blade 7 at the upper reversing position can be sufficiently displayed, and the rod rush angle is small, wherein the same effects as those of the first embodiment can be achieved.

Actually, however, in a case where the second pivot axis 3 at one side portion is inclined forward as described above, it is conceivable that the contacting angle (the pressing direction by the second wiper blade 7) of the second wiper blade 7 with the window surface W side at the lower reversing position is made excessively upward. Therefore, the following countermeasures can be provided.

That is, the second wiper arm 5 is constructed so as to be provided with an alarm head 5a whose base end portion is integrally fixed at the second pivot axis 3, an arm shank 5c that is coupled to the tip end portion of the arm head 5a via a pin shaft 5b so as to swing in the direction of separating from the window surface, and an arm piece 5d integrally coupled to the arm shank 5c. The second wiper blade 7 is coupled to the tip end of of the arm piece 5d. The blade rubber 7b of the second wiper blade 7 is structured so as to press against the window surface W by the resiliently pressing mechanism (not illustrated) that intervenes between the arm head 5a and the arm shank 5c.

Figure 3:
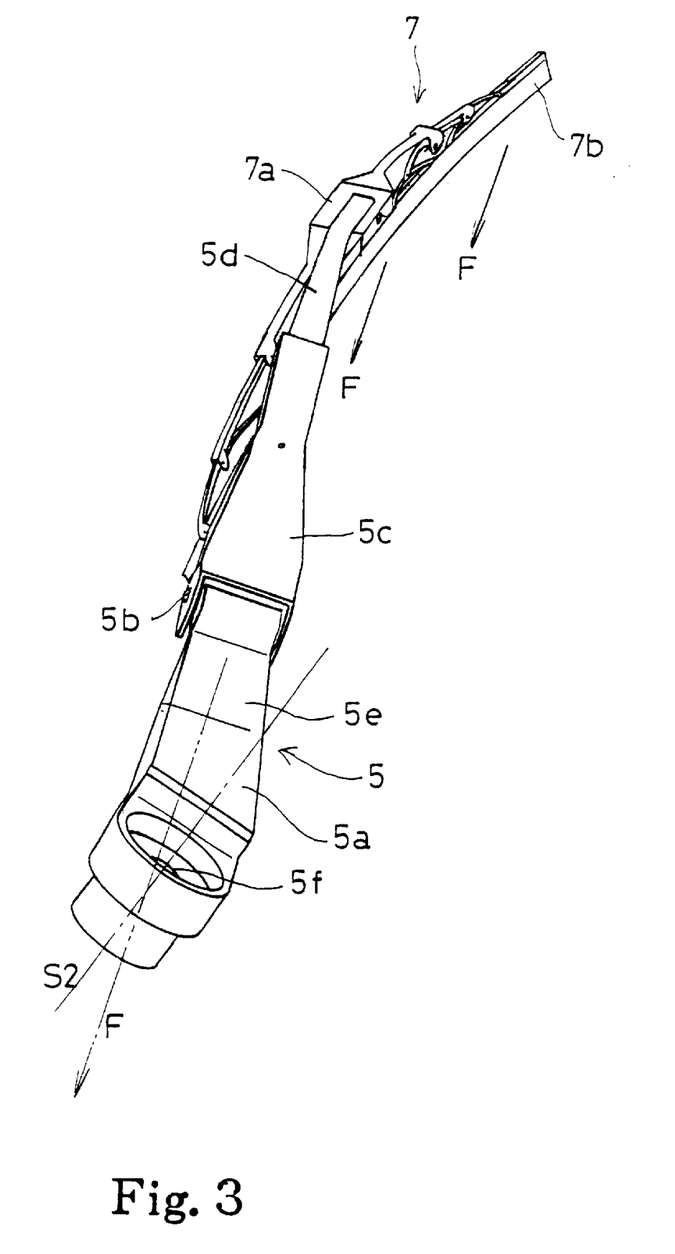
FIG. 3 is a perspective view showing a wiper arm at one side portion according to the second embodiment.

A twisting portion 5e is integrally formed between the tip end portion and base end portion at the second arm head 5a, whereby the pressing direction of the wiper blade 7 attached to the arm head 5a is set so as to be inclined with respect to the axial center line S2 of the second pivot axis 3, and the pressing direction of the blade rubber 7b of the wiper blade 7 is located so as to face to the window surface W in the direction roughly orthogonal to the window surface W over the entire wiping range. That is, it is set that, in a state where a through-hole 5f for coupling the second pivot axis 3, which is the base end side of the twisting portion 5e, is frontally viewed (FIG. 4), the coupling side portion (the window surface pressing direction by the second rubber blade 7b) of the arm shank 5c, which is the tip end side of the twisting portion 5e, is faced to the window surface W in the direction roughly orthogonal to the window surface W. In addition, since the coupling portion of the arm shank 5c swings centering around the pin shaft 5b, the pressing direction to the window surface W is expressed in term of a direction orthogonal to the pin shaft 5b, wherein the pressing direction F is indicated in FIG. 3. Therefore, when the second wiper arm 5 is disposed at the second pivot axis 3 inclined forward relative to the first pivot axis 2 and is located at the lower reversing position, the second wiper blade 7 is set so that it is faced downward and the direction of contact of the blade rubber 7b with the window surface W becomes favorable.

Figure 4:
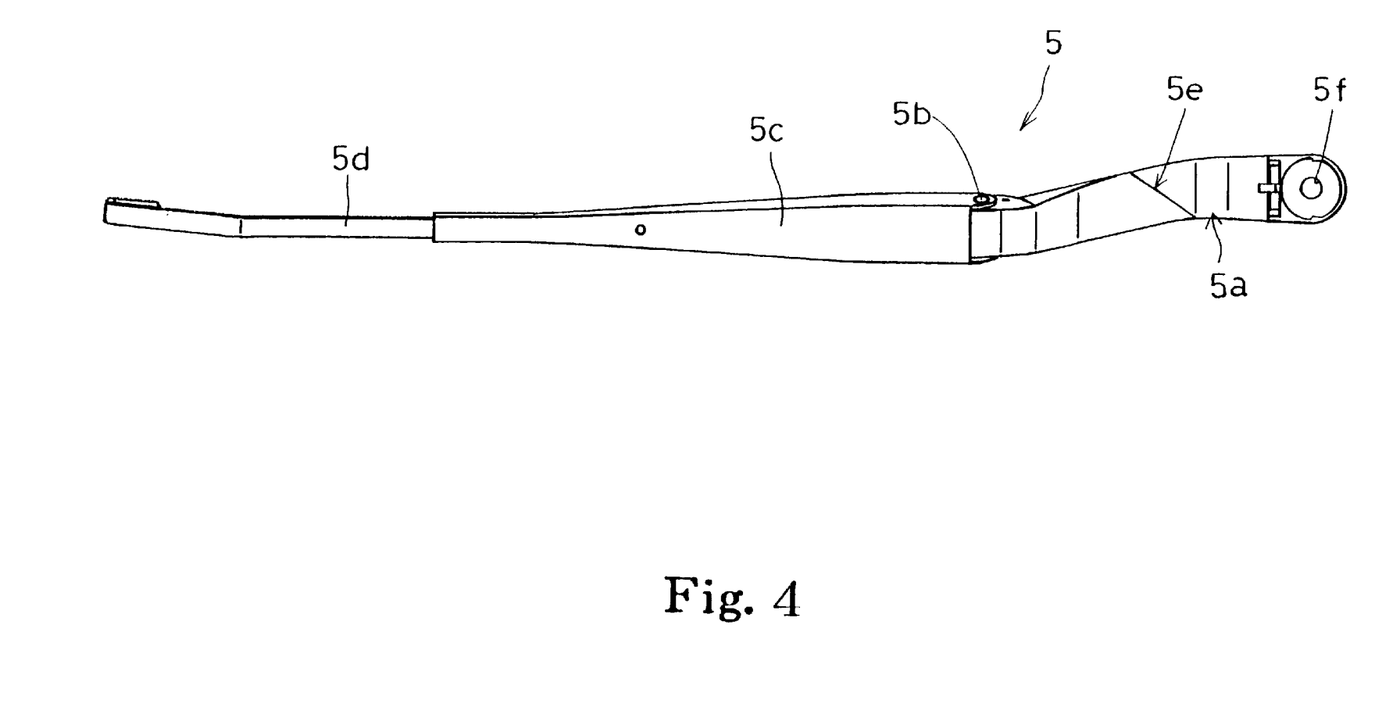
FIG. 4 is a frontal view of a wiper arm at one side portion according to the second embodiment.
Figure 5:
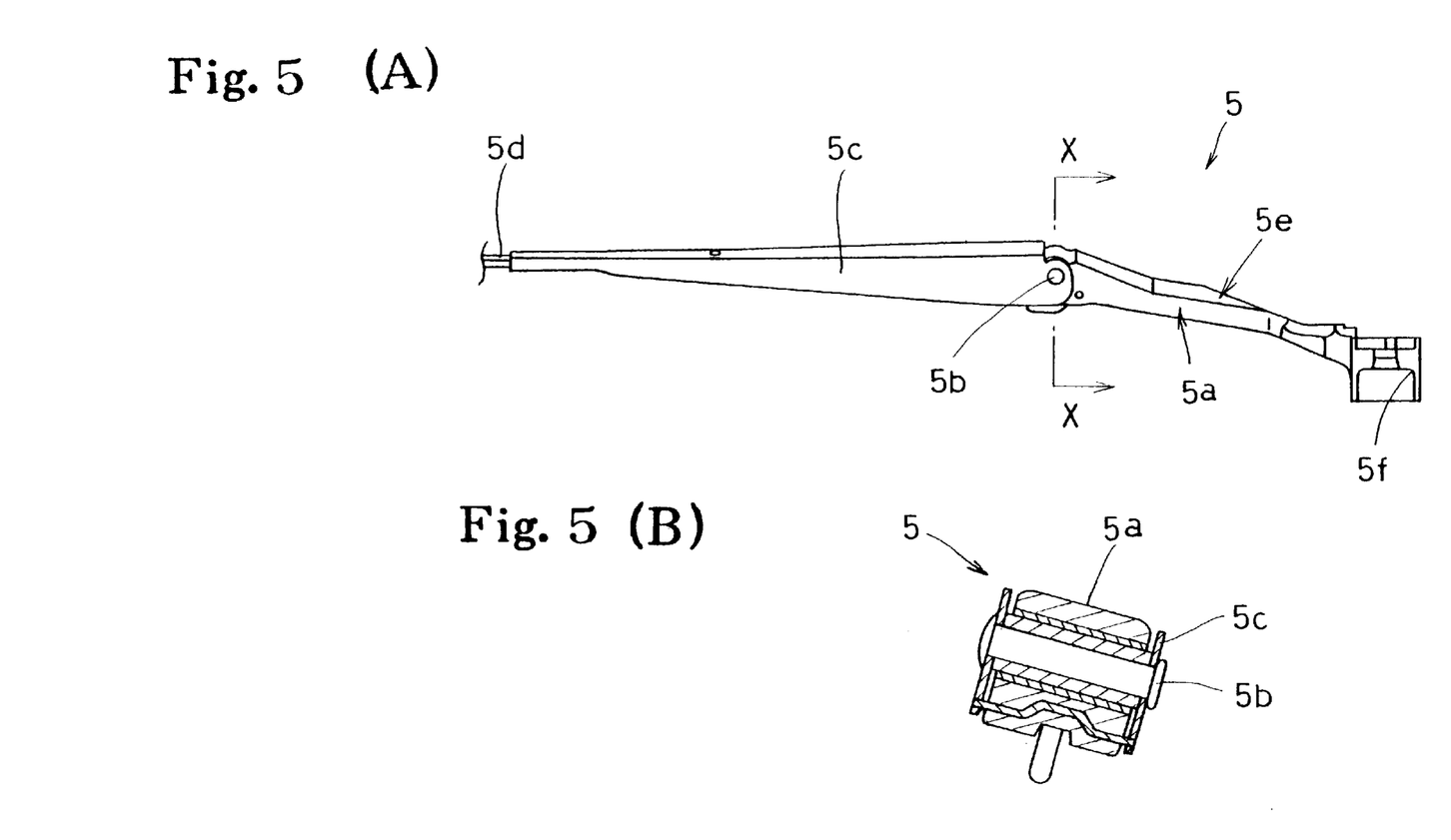
FIG. 5(A) is a side elevational view of a wiper arm at one side portion according to the second embodiment.
FIG. 5(B) is a cross-sectional view taken along the line 5—5 in FIG. 5(A)

In this connection, the second arm head 5a may be structured so that by forming an insertion hole 5f for coupling the arm shaft formed on the arm head 5a in an inclined state without forming the twisting portion, the second wiper blade portion can be faced downward when the through-hole 5f for coupling the second pivot axis 3 is frontally placed, and by forming a pivot axis through-hole 5f of the second arm head 5a in an inclined state, the pressing direction of the wiper blade is made the same as the above.

Thus, the second embodiment can not only approach the rod rush angle of roughly 0° of the second link rod 12 with respect to the second link arm 13 coupled to the second pivot axis 3 at one side portion, but also does not spoil the wiping function at the lower and upper reversing positions by means of the wiper blade 7. In addition, the wiping function can be effectively achieved over the entire range of the swinging area of the wiper arm 5, and the reliability of the final product is increased.

Also, in the respective embodiments, although the invention is employed at only the pivot axis disposed at one side portion of a pair of pivot axes, the invention can be employed for the pivot axis disposed at the central portion.

Generally, the curvature of the window surface W of a vehicle in the left and right direction is set so that it is the smallest in the vicinity of the central portion of the window surface and is gradually increased toward the left and right sides. Therefore, although the problem described with respect to the invention does not occur as the rod rush angle of the pivot axis at the central portion with respect to the link arms and link rod is comparatively small, the invention is very effective if the comparatively small rod rush angle is set to be roughly parallel or the curvature of the window surface in the vicinity of the pivot axis at the central portion is large.

That is, the rod rush angle can be corrected by displacing the first pivot axis 2 so that it is faced inwardly in a case where the central (first) pivot axis 2 disposed at the central portion is faced outwardly in the left and right direction, whereby the plane, including the reciprocatory swinging locus, of the first link arm 11 of the first pivot axis 2 and the axial line of the second link rod 12 in the longitudinal direction become roughly parallel to each other, and the rod rush angle of the second link rod 12 can be made favorable. And, in this case, if the pressing angle of the rubber blade 6b onto the window surface is set to as to become roughly 90° at the upper reversing position of the first wiper arm 4, it is conceivable that the rubber blade 6b generates an error angle at the lower reversing position (the curved portion of the window surface) of the first wiper arm 4. Therefore, in this case, by causing the protruding tip end portion of the first pivot axis 2 to be inclined toward the rear of a vehicle to approach it to the window surface (that is, inclining it backward), the pressing angle of the rubber blade 6b with respect to the window surface is favorably improved over the entire range including the lower and upper reversing positions of the first wiper arm 4.

In addition, in such a case, it is conceivable that the pressing direction of the first wiper blade 6 with respect to the window surface is made excessively downward in the vicinity of the upper reversing position due to the degree of the backward angle. However, because the pressing direction of the first wiper blade 6 disposed at the first wiper arm 4, is set to be inclined with respect to the axial center line of the first pivot axis 2 in this case, that is, to be faced upward with respect to the axial center line S1 of the first pivot axis 2, the error angle occurred in the first wiper arm 4 in the vicinity of the upper reversing position can be improved. Thus, as regards the first pivot axis 2, by making the structure of the second embodiment the reverse of the above-described embodiment, the rod rush angle is made small, thereby producing smooth swinging movement, wherein the wiping function achieved by the wiper blades is excellent.

What is claimed is:

1. A wiper apparatus, comprising;
    a pair of pivot axes, one of which is disposed at the lower part at a roughly central portion in the left and right direction of a curved window surface of a vehicle so as to protrude therefrom, and the other of which is disposed at the lower part at one side of said curved window surface of a vehicle so as to protrude therefrom;
    a pair of link arms, a link arm secured at the lower end of each pivot axis of the pair of pivot axes;
    a link rod for connecting the pair of link arms; and
    a wiper motor coupled to and interlocked with the link rod wherein a wiper arm disposed at a tip end of the each pivot axis of the pivot axes is structured so that each wiper arm is caused to wipe off the window surface through reciprocation on the basis of reciprocatory swinging of the pair of link arms resulting from drive and rotation of the wiper motor and a surface, including a reciprocatory swing locus of at least one link arm, is disposed so as to become parallel to the axial line in the longitudinal direction of the link rod, wherein surfaces in the forward and backward direction, including the axial centerlines of the pair of pivot axes, are disposed so as to become roughly parallel to each other, and a protrusion end portion of one pivot axis is inclined for positional slip in the forward and backward direction with respect to the protrusion end portion of the other pivot axis.

2. The wiper apparatus as set forth in claim 1, wherein the wiper arm is provided with a wiper blade, at the tip end of thereof, in a state where each wiper blade is pressed to the window surface of a vehicle, and the pressing direction of each wiper blade is established so as to be inclined with respect to the axial center line of the each pivot axis of the pair of pivot axes so that the direction becomes roughly orthogonal to the window surface.

3. A wiper apparatus, comprising;
    a pair of pivot axes, one of which is disposed at the lower part at a roughly central portion in the left and right direction of a curved window surface of a vehicle so as to protrude therefrom, and the other of which is disposed at the lower part at one side of said curved window surface of a vehicle so as to protrude therefrom;
    a pair of link arms, a link arm secured at the lower end of each pivot axis of the pair of pivot axes;
    a link rod for connecting the pair of link arms; and
    a wiper motor coupled to and interlocked with the link rod wherein a wiper arm disposed at a tip end of the each pivot axis of the pivot axes is structured so that each wiper arm is caused to wipe off the window surface through reciprocation on the basis of reciprocatory swinging of the pair of link arms resulting from drive and rotation of the wiper motor and a surface, including a reciprocatory swing locus of at least one link arm, is disposed so as to become parallel to the axial line in the longitudinal direction of the link rod, wherein a protrusion end portion of one pivot axis is inclined for positional slip in the forward and backward direction with respect to the protrusion end portion of the other pivot axis.

4. The wiper apparatus as set forth in claim 3, wherein the wiper arm is provided with a wiper blade, at the tip end of thereof, in a state where each wiper blade is pressed to the window surface of a vehicle, and the pressing direction of each wiper blade is established so as to be inclined with respect to the axial center line of the each pivot axis of the pair of pivot axes so that the direction becomes roughly orthogonal to the window surface.

* * * * *